Aug. 27, 1929.  C. H. TRINES  1,726,087
CAMERA
Filed Nov. 11, 1927
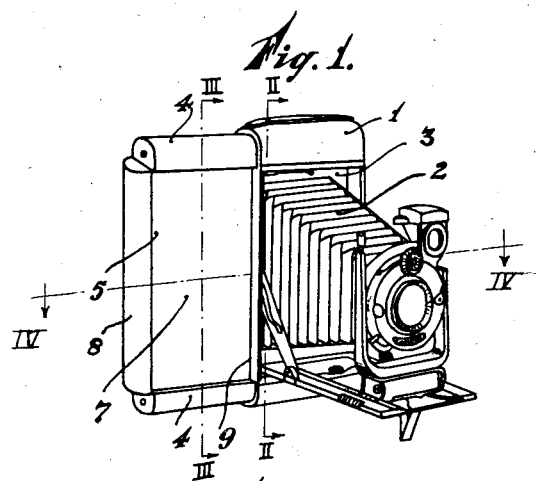
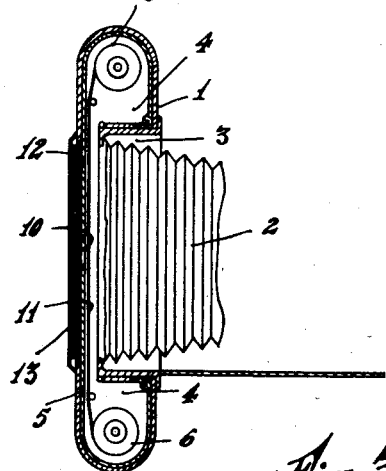
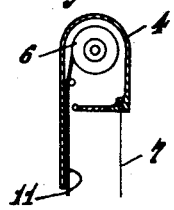
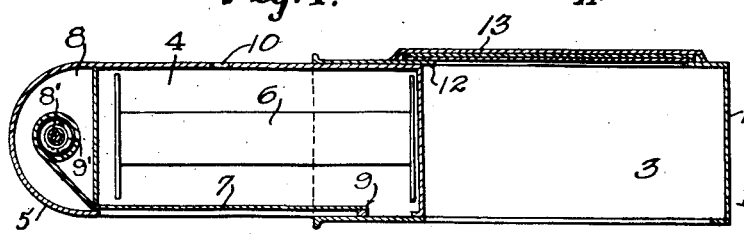
C. H. Trines
INVENTOR
By: Marks & Clark
Attys.

Patented Aug. 27, 1929.

1,726,087

UNITED STATES PATENT OFFICE.

CLEMENS HUBERTUS TRINES, OF AMSTERDAM, NETHERLANDS.

CAMERA.

Application filed November 11, 1927, Serial No. 232,650, and in the Netherlands December 15, 1925.

I have filed an application on this invention in the Netherlands, No. 32,109 Ned. dated December 15, 1925.

The known rollfilm-cameras have the disadvantage that the adjustment of the image formed by the lens can only be effected approximately.

In order to remove this disadvantage it has been proposed to provide the rollfilm camera with a slidable film carrier with image-window and with an adjusting ground glass-plate located in the rear-wall of the camera and being free for adjusting the image on the glass-plate when the rollfilm-carrier has been drawn out.

For photographing a slide is used adapted to be drawn out by hand and protecting the film against exposure, when the carrier has been drawn out.

This camera is not practical for the reason that when drawing out the slide in the drawn-out-position of the film-carrier, the entire film is made useless. This drawback is overcome by providing the rollfilm-carrier or the camera-casing with a spring-actuated rotatable roller with curtain and connecting one end of the curtain to the camera-casing or the rollfilm-carrier, in such a manner, that, when drawing out the rollfilm-carrier, the curtain unwinds and closes the image-window, and when pushing in the rollfilm-carrier, the curtain is automatically wound up and the image-window made free, ready for adjusting the image on the glass-plate.

With this camera it is thus impossible to expose the film erroneously; exposure can only be obtained through the lens.

The invention will be more fully understood with reference to the accompanying drawing, illustrating one embodiment by way of example.

Fig. 1 shows a rollfilm-camera according to the invention with drawn-out film-carrier.

Fig. 2 is a section on a larger scale of the said camera in the neighbourhood of one of the vertical sidewalls, approximately on the line II—II in Fig. 1, the film-carrier being pushed in.

Fig. 3 is a section on the line III—III in Fig. 1 of part of the drawn-out film-carrier.

Fig. 4 is an enlarged horizontal section taken on line IV—IV of Fig. 1 with the front part of the camera removed in the direction in which the arrows point.

In the drawings 1 is the casing, containing in the ordinary manner a belly 2. In the casing, at either side of the belly space 3, a film-carrier is slidably mounted in the direction of the axis of the film-coils 6. The said carrier consists of two closed parts 4 interconnected by a partition 5 and containing the film-coils 6. The film 11 moves along the front-side of the partition 5, and, when the camera is ready for taking a photo, is exposed at the front-side to the rays of light passing through the objective, while on adjustment of the image on the glass-plate it is protected against the rays of light by a curtain 7, normally kept wound up in the curtain-holder 8, on a roller 8' controlled by a spring 9' and secured to the casing of the camera at 9.

The partition 5 is provided with a red window 10 for controlling the numbers of the fields of the film 11, while in the back of the casing 1 a rectangular hole has been made for an adjusting ground glass-plate 12, which is normally covered by a folded adjusting-cap 13.

The camera is operated as follows:

The rollfilm-carrier is drawn out of the casing 1, whereby the curtain 7 is automatically unwound and protects the film 11 against the light. The image may now be accurately adjusted on the adjusting ground-plate 12, which is now freely standing opposite the objective. Thereupon the rollfilm-carrier is pushed back into the casing, whereby the spring-actuated curtain is wound up automatically and the opening of the partition 5 of the carrier is made free. The photo may now be taken in the normal way.

It is finally remarked that the camera according to the invention in folded condition need not occupy more space than the normal rollfilm-cameras.

I claim:

1. A camera comprising a casing having one side open, a roll carrier slidably mounted in said casing and adapted to be extended outwardly through the open side thereof, a film roll in said carrier and a curtain operatively connected to the casing and to the carrier and actuated upon relative sliding movement between said carrier and said casing for covering said film roll when the carrier is in an extended position.

2. A camera comprising a casing open at one side thereof, a lens, a roll carrier slidably mounted in said casing, means for holding a film roll in said carrier, said carrier and said roll being adapted to be shifted out of alignment with said lens, a curtain secured at one end to said casing, and a spring actuated roller in said carrier, the other end of said curtain being secured to said roller, whereby when said carrier is shifted the curtain is unwound to cover said film.

In testimony whereof I affix my signature.

CLEMENS HUBERTUS TRINES.